United States Patent [19]
Rambauske et al.

[11] 3,959,738
[45] May 25, 1976

[54] LASER

[75] Inventors: Werner R. Rambauske, Carlisle; Philip J. McFarland, Lynnfield, both of Mass.

[73] Assignee: Raytheon Company, Lexington, Mass.

[22] Filed: June 3, 1974

[21] Appl. No.: 475,356

[52] U.S. Cl............................. 331/94.5 C; 350/299
[51] Int. Cl.² ........................................ H01S 3/081
[58] Field of Search ............ 331/94.5; 350/294, 299

[56] References Cited
UNITED STATES PATENTS 3,792,370  2/1974  Goldstein et al. ............... 331/94.5 C

*Primary Examiner*—William L. Sikes
*Attorney, Agent, or Firm*—Philip J. McFarland; Joseph D. Pannone

[57] ABSTRACT

An improved laser particularly well adapted to produce high flux densities is disclosed. The disclosed laser includes an optical cavity wherein a curved window and a convex mirror make up one end wall assembly, such window and mirror being disposed with respect to each other in such a manner that the flux density at the window is less than the flux density at the mirror and, at the same time, energy reflected from the window constructively interferes with energy within the optical cavity.

5 Claims, 3 Drawing Figures

LASER

BACKGROUND OF THE INVENTION

This invention pertains generally to lasers and particularly to resonant cavities in such devices.

It is known in the art that the end walls of a resonant cavity in a laser may be defined by parallel plane mirrors, one of which is totally reflective and the other of which is partially reflective. When laser action occurs, constructive interference is experienced only by light having a desired wavelength. As a result then, the radiant energy from the laser is formed into a highly collimated solid beam passing through the partially reflective mirror. Unfortunately, such beam is concentrated on the partially reflective mirror with the result that, even though only a relatively small portion of such beam may be absorbed by the mirror material, sufficient localized heating may be experienced to induce appreciable thermal strains in the partially reflective mirror. As a matter of fact, such strains, which increase with an increase in flux density of the laser energy, ultimately become great enough to cause spontaneous fracturing of the partially reflective mirror.

It is known in the art that the flux density of laser energy on the partially reflecting mirror in a laser cavity may be reduced by directing the laser energy toward a ring-shaped area on such mirror. Thus, by arranging, as shown in U.S. Pat. No. 3,792,370, opposing mirrors within a laser cavity, the laser energy may be spread out to cover a ring having a much larger area than the area covered by the laser energy in a cavity using only parallel mirrors. Consequently, for equal amounts of laser energy, the arrangement shown in U.S. Pat. No. 3,792,370 is less susceptible to damage from thermal strains within the partially reflective mirror. Although an arrangement as just mentioned makes it possible to increase the amount of laser energy passing through the partially reflective mirror in an optical cavity, it is desirable to permit even greater amounts of laser energy to be passed through such a mirror.

It is also known in the art that either the partially reflective mirror or the totally reflective mirror (or both such mirrors) making up the end walls of an optical cavity of a laser may correspond to zones of selected spheres. According to the art, however, the spacing between such end walls is dependent upon the radius of curvature of the curved mirror (if one is curved) or upon the radii of curvature of the two mirrors (if both are curved). Such dependence, in turn, makes it impossible to change the length of the optical cavity without changing the curvature of either, or both, end walls.

Therefore, it is a primary object of this invention to provide an improved laser wherein the density of laser energy passing through a partially reflective mirror in an optical cavity in such laser may be reduced.

Another object of this invention is to provide an improved laser as just mentioned, the optical cavity within such laser being adapted to support laser energy in a hollow cylindrical beam-like configuration.

Still another object of this invention is to provide an improved laser as mentioned above, such laser utilizing at least a curved partially reflective mirror to define one end wall of an optical cavity, the length of such cavity being independent of the curvature of such mirror.

SUMMARY OF THE INVENTION

These and other objects of this invention are generally attained by providing, in the optical cavity of a laser, a curved convex mirror aligned with an axis of symmetry of such cavity and arranged to reflect laser energy to form a divergent beam apparently originating at points on a circle and a concave partially reflective mirror having radii of curvature originating on such circle arranged to intercept the divergent beam and to serve as one end wall of such cavity. The laser energy passing through the curved partially reflective mirror may then be directed as desired by appropriately shaped and positioned mirrors. In a preferred embodiment a second curved convex mirror and a concave totally reflecting mirror are combined to form the second end wall of the optical cavity. With the mirrors properly shaped and aligned, the laser energy may be caused to be restricted to a hollow cylindrical path between the two mirrors and the curvature of the partially reflective and totally reflective mirrors may be varied within wide limits without regard for the length of the optical cavity.

BRIEF DESCRIPTION OF THE DRAWINGS

For a more complete understanding of this invention, reference is now made to the drawings wherein.

DESCRIPTION OF THE PREFERRED EMBODIMENT

Figure 1:
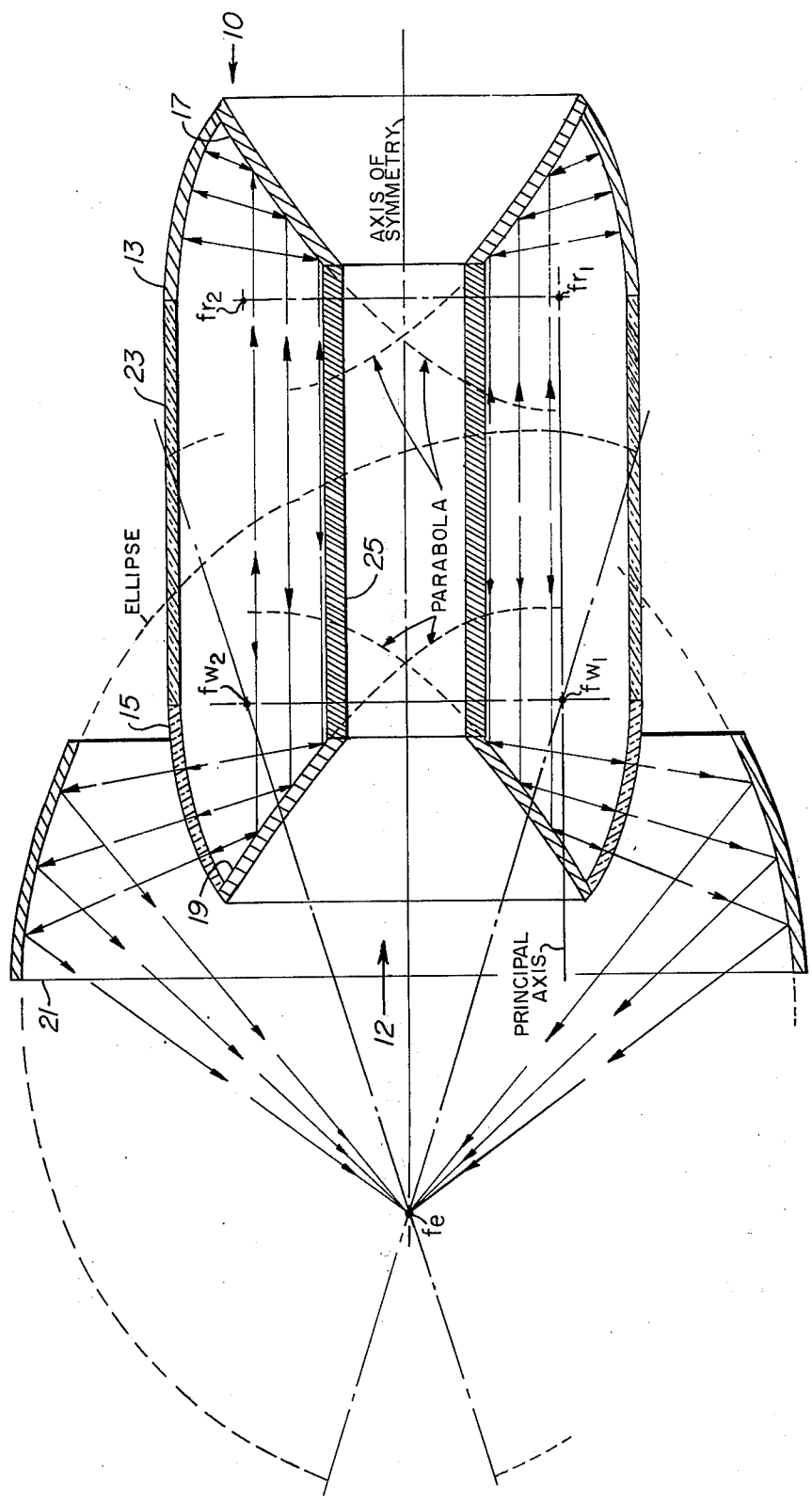
FIG. 1 is a sketch illustrating the way in which laser energy is reflected back and forth within an optical cavity according to this invention and a way in which the emergent energy may be redirected.

Referring now to FIG. 1, the arrows (unnumbered) indicate schematically how the mirror elements of the contemplated optical cavity are shaped and disposed with respect to one another. Thus, each end wall assembly 10, 12 is symmetrically disposed about an axis of symmetry so that laser energy at a desired wavelength is reflected back and forth between a totally reflective mirror 13 and a partially reflective mirror 15, such energy being redirected in each transit by convex mirrors 17, 19. The latter mirrors have reflecting surfaces formed by rotating portions (here the sections indicated by solid lines) of opposing parabolas having focal points, $fw_1$ and $fr_1$, lying on a common principal axis about an axis of symmetry. When such sections are rotated 180° focal point $fw_1$ appears at $fw_2$ and focal point $fr_1$ appears at $fr_2$. Thus, in the illustrated example, $fw_1$ and $fr_1$ are the focal points for the upper halves of convex mirrors 17, 19 and $fw_2$ and $fr_2$ are the focal points for the lower halves of such mirrors. The totally reflective mirror 13 and the partially reflective mirror 15 are formed by rotating arcs of circles, also centered on $fr_1$ and $fw_1$, about the axis of symmetry. It follows then that $fr_2$ and $fw_2$ are also the focal points of the lower halves of the last mentioned mirrors. It also follows that if the generatrices, i.e. the particular portions of the parabolas and the particular arcs of the circles are rotated through 360°: (a) the focal points of each pair of chosen curves will trace coincident circles about the axis of symmetry; (b) the reflecting surfaces of the totally reflective mirror 13 and of the partially reflective mirror 15 will resemble spheroidal zones; and (c) the reflective surfaces of the convex mirrors 17, 19 resemble truncated paraboloids. It should, however, be noted that, because the centers of curvature of the former mirrors are not on the axis of symmetry, the reflecting surfaces of those mirrors are not conventional spheroidal zones and that, because the foci of the reflecting surfaces of the latter mirrors similarly are not on the axis of symmetry, they are not conventional truncated paraboloids. To distinguish between the shapes herein contemplated as those best adapted for use and conventional shapes, the prefix "R" will be applied. Thus, the shape of the totally reflective mirror 13 and the partially reflective mirror 15 will hereinafter be designated as an "R-spheroidal zone"; the shape of convex mirrors 17, 19 will be "truncated R-paraboloidal"; and the shape of the mirror outside the illustrated optical cavity (here a mirror 21 having a reflecting surface corresponding to the shape formed by rotating a portion of an ellipse, having one focal point, $fe$, on the axis of symmetry and the other focal point coincident with focal point $fw_1$, about the axis of symmetry) will be designated as an " R-ellipsoidal zone".

To complete the description of the elements of the sketch shown in FIG. 1, a cylindrical glass enclosure and a cylindrical metallic sleeve, here, respectively, sleeve 23 and cylinder 25, are disposed as shown. Such sleeve and cylinder then, along with the partially reflective mirror 15, the totally reflective mirrors 13 and the convex mirrors 12, 10 define a closed space into which a lasing gas or liquid may be introduced in any conventional manner (not shown). Obviously, if a solid laser were to be desired, the sleeve 23 and cylinder 25 would not be required. As a matter of fact, if proper portions of the parabolas used as the generatrices of the convex mirrors 17, 19 are selected the laser energy (meaning the stimulated energy having a desired wavelength) may experience total internal reflection from such mirrors, thereby obviating any necessity for providing metallic reflecting surfaces. That is, the surface of the laser material itself could be shaped to provide the convex mirrors 17, 19.

Figure 1A:
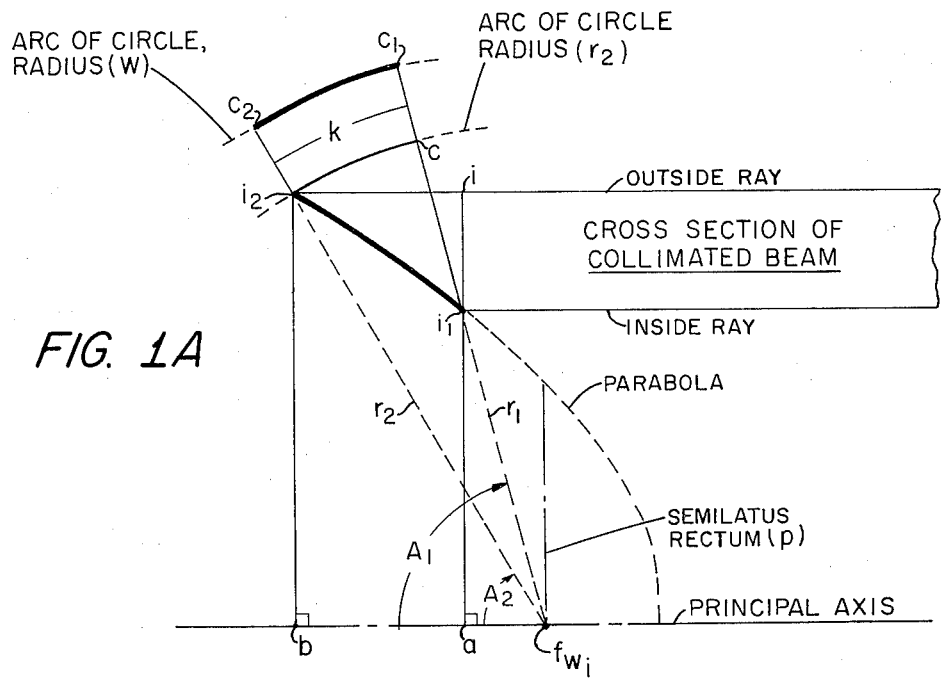
FIG. 1A is a sketch showing the fact that the length of the optical cavity is constant for all laser energy.

It is, of course, an absolute requirement for proper operation of any optical cavity, that the length, L, of the path for all laser energy between the totally reflective and partially reflective mirrors making up the end walls of such cavity be constant. Referring now to FIG. 1A as well as FIG. 1, it may be seen that such required constancy is attained if the length of the paths for all rays in a collimated beam are the same, as measured from any plane orthogonal to such beam to the partially reflective mirror 15 (or to the totally reflective mirror 13). Thus, in FIG. 1A the line $ii_1$ is the locus of the intersection of such an orthogonal plane at the point of intersection, $i_1$, of the inside ray in a collimated beam (which is parallel to the principal axis) on a parabolic surface having a focal point, $fw_1$. Arc $i_2c$ is an arc of a circle centered at $fw_1$ and passing through the point of intersection, $i_2$, of the outside ray in the collimated beam on the parabolic surface. It will be evident that all rays in the collimated beam will, after reflection, be redirected as though they had originated at the focal point, $fw_1$, and that all such rays fall on the arc $i_2c$ between the points $i_2$ and $c$. If, then, the length of the line $i_1c$ and the length of the line $ii_2$ are the same, then the length of the paths of rays from the same points to points on the arc $c_2c_1$ (which points are on the circumference of a circle centered at $fw_1$) will also be equal. Equations 1 through 6 following, wherein the symbols correspond to the symbols used in FIG. 1A, show that the length of the line $i_1c$ and the line $ii_2$ are the same.

$$i_1c = r_2 - r_1 \tag{1}$$

$$i\,i_2 = r_2 \cos A_2 - r_1 \cos A_1 \tag{2}$$

$$i_1c - ii_2 = r_2(1-\cos A_2) - r_1(1-\cos A_2) \tag{3}$$

but $$r_2(1-\cos A_2) = p \tag{4}$$

and $$r_1(1-\cos A_1) = p \tag{5}$$

Therefore, $$i_1c - ii_2 = p - p = 0. \tag{6}$$

Following the rationale exemplified by the foregoing equations, it may be shown that the length of any ray from its intersection with the line $ii_1$ to the arc $i_2c$ is the same as the length of the line $i_1c$ or the line $ii_2$.

Figure 2:
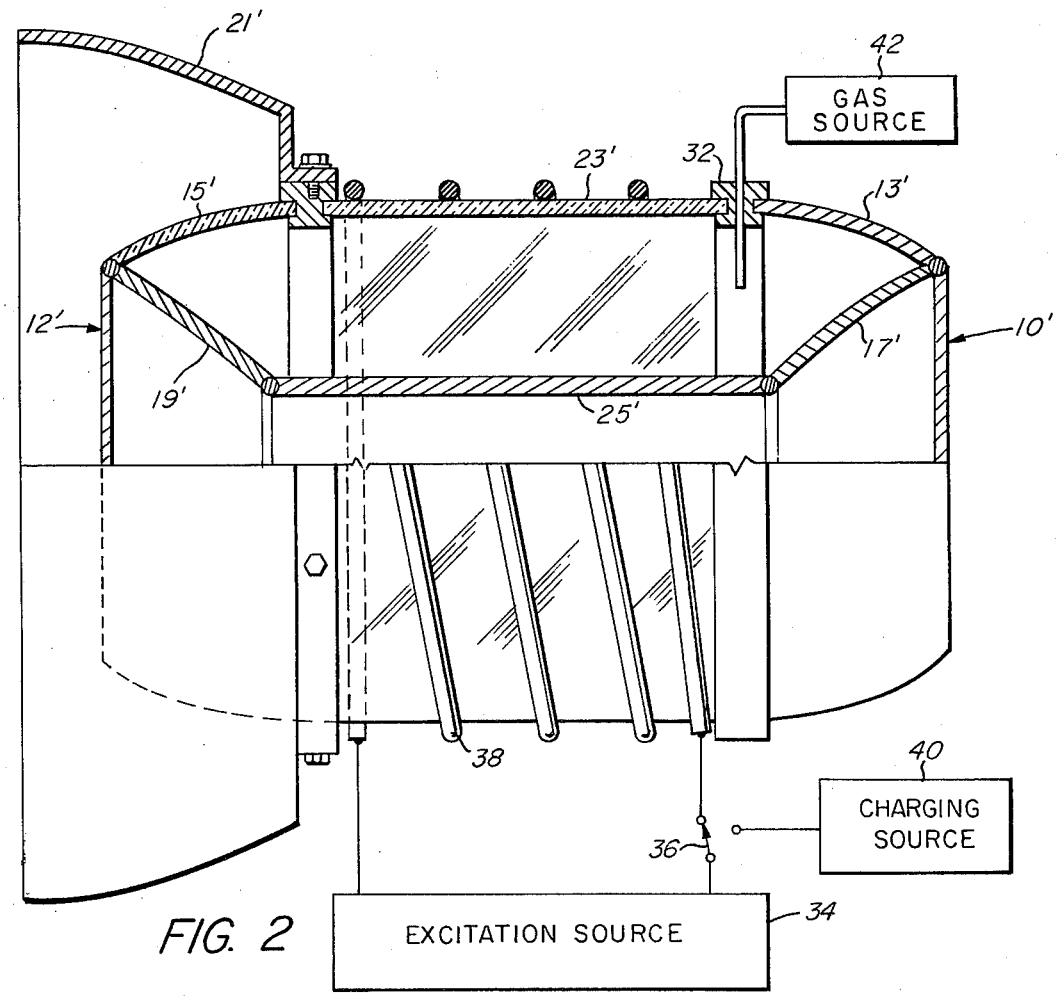
FIG. 2 is a view, partially broken away, of an improved laser incorporating the principles illustrated in FIG. 1.

Referring now to FIG. 2 (wherein elements shown in FIG. 1 have corresponding numerals with superscripts) it may be seen that mirrors according to the concepts of this invention may be assembled using standard techniques to provide an improved laser when actuated. Thus, the various elements indicated by numerals with superscripts in FIG. 2 may be mounted on ring members 30, 32 to form an integral assembly making up an optical cavity. An excitation source 34, i.e. a plurality of batteries, is then connected, via any convenient switching arrangement 36, to a gaseous discharge device 38 or a charging source 40. Any lasing gas desired to be used is introduced into the optical cavity from a gas source 42 by way of a pipe (not numbered), here a pipe connected to a passage through the ring member 32. By periodically pumping the laser medium, i.e. the chosen gas, with light emitted from the gaseous discharge device 38, lasing action is stimulated within such medium. That portion of the laser energy, after reflecting back and forth between the totally reflective mirror 13' and the partially reflective mirror 15', which is subjected to constructive interference forms a collimated beam in a hollow cylindrical shape between the sleeve 23' and the cylinder 25'. After reflection from the convex mirror 17' such beam is changed to a diverging beam. After reflection from the totally reflective mirror 13' such diverging beam is reversed into a retrograde converging beam. Therefore, after reflection from the convex mirror 17' the beam is converted back into a collimated beam. The same process occurs between the convex mirror 17' and the partially reflective mirror 15'. Additionally, of course, a part of the laser energy passes through the partially reflective mirror 15' in a diverging beam. Such beam, after reflection from the mirror 21', is directed as desired.

The partially reflective mirror may be made by applying, in any known way, a coating of a material such as zinc selenide (ZnSe) or salt (NaCl) to a formed transparent base. In any event it is clear that, because the mirrors 13', 15' need bear no particular relationship to each other, the radius of curvature of the partially reflective mirror 15' may be made relatively large with respect to the transverse dimensions of the convex mirror 19'. The Theorem of Pappus would then dictate that the area of the partially reflective mirror 15' may be made to be similarly larger than the area of the convex mirror 19' (with a concomitant reduction in luminous flux density in the former). That is, because:

$$A_{15}'/A_{19}' = (l_{15}')(d_{15}')/(l_{19}')(d_{19}') \qquad (7)$$

where
- $A_{15}'$ is the area of the partially reflective mirror 15';
- $A_{19}'$ is the area of the convex mirror 19';
- $l_{15}'$ is the length of the arc of the circle generating the partially reflective mirror 15';
- $d_{15}'$ is the distance of the center of gravity of $l_{15}'$ from the axis of symmetry;
- $l_{19}'$ is the length of the portion of the parabola generating the convex mirror 19';
- $d_{19}'$ is the distance of the center of gravity of $l_{19}'$ from the axis of symmetry; and consequently, $$D_{15}'/D_{19}' = A_{19}'/A_{15}' \qquad (8)$$

where $D_{15}'$ is the luminous flux density at the partially reflective mirror 15'; and $D_{19}'$ is the luminous flux density at the convex mirror 19'.

Considering FIG. 2 and Equations (7) and (8), it will be obvious that the greatest flux density on any mirror in a laser according to this invention is the flux density on the convex mirrors 17', 19' (assuming the areas of the two to be equal). It follows then, because the convex mirrors 17', 19' may be hollow and may be joined by the cylinder 25' (which also may be hollow), a coolant may conveniently be applied to the interiors of such mirrors in any conventional way (not shown) through the end wall assembly 10'. Additionally, of course, portions of the space within the convex mirrors 17', 19' and the cylinder 25' could be occupied by any equipment, as, for example, the gas source 42'. Still further, it will be obvious that the disclosed arrangement could be modified to permit continuous lasing rather than the pulsed lasing as described. Even still further, it will be obvious that the end wall assembly 10' could be replaced by an optically flat annular ring and that the mirror 21' need not be an R-ellipsoid.

Finally, it will be noted that so long as the collimated laser energy is restricted to a hollow cylindrical path around the cylinder 25' the convex mirrors 17', 19' may be conventional truncated paraboloids and the totally reflective mirror 13' and the partially reflective mirror 15' may be conventional spheroidal zones. That is, the just mentioned elements may have focal points on the axis of symmetry. It should be noted, however, that if such conventional shapes are used the flux density on the convex mirrors 17', 19' will be higher than on the mirrors in the preferred embodiment if the density of the cylinder 25' is maintained constant.

Having described a preferred embodiment of this invention and ways in which the invention may be modified, it is felt that this invention should not be restricted to its disclosed embodiment but rather should be limited only by the spirit and scope of the appended claims.

What is claimed is:

1. In a laser incorporating an optical cavity wherein stimulated radiation at a selected wavelength is subjected to constructive interference to render such radiation coherent after a plurality of reflections between a pair of end walls of such cavity, an improved optical cavity comprising:
   a. a partially reflective mirror disposed to operate as one end wall of an optical cavity, the reflecting surface of such mirror being concave and corresponding to the shape generated by rotating a minor arc of a first circle about an axis of symmetry of the optical cavity;
   b. a first convex mirror disposed within the optical cavity, the reflecting surface of such first convex mirror being positioned between the partially reflective mirror and the axis of symmetry of the optical cavity, such reflecting surface corresponding to the shape generated by rotating a portion of a first parabola about the axis of symmetry of the optical cavity, the focal point of the first parabola being coincident with the center of curvature of the minor arc of the first circle.

2. An improved optical cavity as in claim 1 wherein the center of curvature of the reflecting surface of the partially reflective mirror lies on a first focal circle in a plane orthogonal to the axis of symmetry of the optical cavity, such first focal circle being centered on such axis.

3. An improved optical cavity as in claim 2 wherein all parts of the reflecting surface of the first convex mirror are spaced from the axis of symmetry of the optical cavity.

4. An improved optical cavity as in claim 3 comprising, additionally,
   a. a second convex mirror disposed within the optical cavity, the reflecting surface of such second convex mirror corresponding to the shape generated by rotating a portion of a second parabola about the axis of symmetry of the optical cavity, the principal axis of the second parabola being parallel to, or collinear with, the principal axis of the first parabola; and,
   b. a totally reflective mirror disposed to operate as the second end wall of the optical cavity, the reflecting surface of such mirror being concave and corresponding to the shape generated by rotating a minor arc of a second circle about the axis of symmetry of the optical cavity, the center of curvature of the reflecting surface of such totally reflective mirror being coincident with the focal point of the second parabola.

5. An improved optical cavity as in claim 4 wherein twice the path length of coherent radiation between the partially reflective mirror and the totally reflective mirror is an integral multiple of the wavelength of the coherent radiation within the optical cavity.

* * * * *